United States Patent [19]

Loland

[11] 4,139,222
[45] Feb. 13, 1979

[54] QUICK CONNECT/DISCONNECT COUPLING ASSEMBLY

[75] Inventor: Sven Loland, Irving City, Calif.

[73] Assignee: Santa Fe International Corp., Orange, Calif.

[21] Appl. No.: 789,927

[22] Filed: Apr. 22, 1977

[51] Int. Cl.² .............................................. F16L 37/22
[52] U.S. Cl. ...................................... 285/27; 285/12; 285/316
[58] Field of Search .................... 285/316, 277, 27, 24

[56] References Cited

U.S. PATENT DOCUMENTS

| | | | |
|---|---|---|---|
| 2,565,572 | 8/1951 | Pangborn | 285/316 X |
| 2,673,750 | 3/1954 | Scheiwer | 285/277 |
| 2,689,138 | 9/1954 | Scheiwer | 285/277 X |
| 2,736,578 | 2/1956 | Rafferty | 285/277 X |
| 2,935,338 | 5/1960 | Mills, Jr. | 285/277 X |
| 3,140,072 | 7/1964 | Sciuto, Jr. | 285/277 X |
| 3,280,526 | 10/1966 | Pepitone | 285/277 X |
| 3,422,390 | 1/1969 | Tucker | 285/277 X |
| 3,817,560 | 6/1974 | Guertin | 285/277 X |

FOREIGN PATENT DOCUMENTS

1248188  10/1960  France ..................... 285/277

Primary Examiner—Thomas F. Callaghan
Attorney, Agent, or Firm—LeBlanc & Shur

[57] ABSTRACT

A quick connect/disconnect coupling assembly particularly adapted for underwater use, having a pair of coupling members, one of which is mounted on a relatively rigid structure, and a sleeve mounted over the first coupling member for relative axial and rotational movement. The sleeve is guided by a single or double J slot between axially extended locking and axially retracted unlocking positions. In the locking position, a cammed surface on the inside of the sleeve engages a ball and socket arrangement on the coupling members to prevent the coupling members from becoming unlocked; in the axially retracted unlocking position, the cammed surface of the sleeve is moved away from the ball and socket arrangement to permit free radial movement of the ball out of the socket and relative axial movement of the coupling members into and out of coupling engagement with each other. The sleeve is lockable in the axially extended locking position to provide a positive lock. Locking and unlocking is accomplished by specific pulling, twisting and pushing forces on the sleeve and/or coupling members.

13 Claims, 19 Drawing Figures

QUICK CONNECT/DISCONNECT COUPLING ASSEMBLY

BACKGROUND OF THE INVENTION

This invention relates to connectors, and particularly to connectors used in underwater environments at great depths.

In the fields of underwater drilling, pipeline laying, etc., it is often necessary to make or break hose connections on the ocean bottom at depths in excess of 150–200 feet. For example, it might be desirable to connect or disconnect supply hoses to a pipe entrenching sea sled apparatus of the type described in U.S. Pat. No. 3,877,238 issued Apr. 15, 1975 to Chang et al. and commonly assigned with this invention. Or, it may be desirable to connect or disconnect hoses at a wellhead located on the ocean bottom hundreds of feet below the surface.

Skin divers wearing conventional wetsuits cannot operate at such depths and it is therefore necessary to use alternative systems, such as diving bells with manipulator arms, or dry diving suits, commonly equipped with two "arms". The arms of such devices are generally limited in their movement and are usually able to push, pull and twist objects, but only in a sequence. It is usually only possible to use one arm at a time.

It is therefore an object of this invention to provide a connector which can be readily used in conjunction with the manipulator arms of deep diving systems.

It is a further object to provide a quick connect/disconnect coupling assembly which will release on a straight pulling force and lock on a push-twist force.

It is a further object to provide a connector that may be positively mechanically locked by an additional twisting force after the connector is locked and positively mechanically unlocked by a twisting force in the opposite direction.

SUMMARY OF THE INVENTION

The invention is embodied in two basically similar forms, each comprising an elongated cylindrical adapter member having a female coupling secured at one end and having means for attachment to a hose at the other end. A sleeve member is movably mounted around the circumference of the female coupling member and the end portion of the adapter to which the coupling is attached. The sleeve and adapter are relatively movable, guided by J-slots in the sleeve which cooperate with shoulder screws fitted to the adapter piece. Relative axial movement of the sleeve and adapter is permitted between axially extended (locking) and axially retracted (pre-set) positions. Springs are provided to normally bias the sleeve into its locking position.

The first embodiment uses index pins to stop relative rotation between the outer sleeve and receiving plate and requires a preset of the outer sleeve in the retracted position before engaging the two connector halves. This is done while in the index/rest position on a connector plate. When the connector is engaged by a straight push force, the outer sleeve will spring lock when rotating the connector's inner body clockwise for the shoulder pin to release from the J-slot in the outer sleeve. The connector is now locked and can only be released by a pull force (retract) on the outer sleeve that is greater than the spring force. If the mechanical positive lock is engaged by rotating further clockwise, the connector will not open on a straight pull (retract) force applied to the outer sleeve.

The second embodiment does not require a preset of the outer sleeve in the retracted position. When engaging the two connector halves, the index pins will bottom out at the top of a cam located at the receiving plate and an additional push on the connector will force the outer sleeve to move to the "retracted" position. The shoulder pin will now be locked in the J-slot and the outer sleeve will rotate with the inner body when twisted. The index pins will follow the cam until the two connector halves are fully engaged and the pins finally fall into the bottomless holes in the receiving plate. The springs will force the outer sleeve to move in and lock the connector. The shoulder pin will now be free from the J-slot and an additional counterclockwise twist (opposite the cam direction) applied to the connector inner body, will provide a positive mechanical lock of the outer sleeve.

DESCRIPTION OF THE PREFERRED EMBODIMENTS

Figures 1, 1A, 3A, 3B:
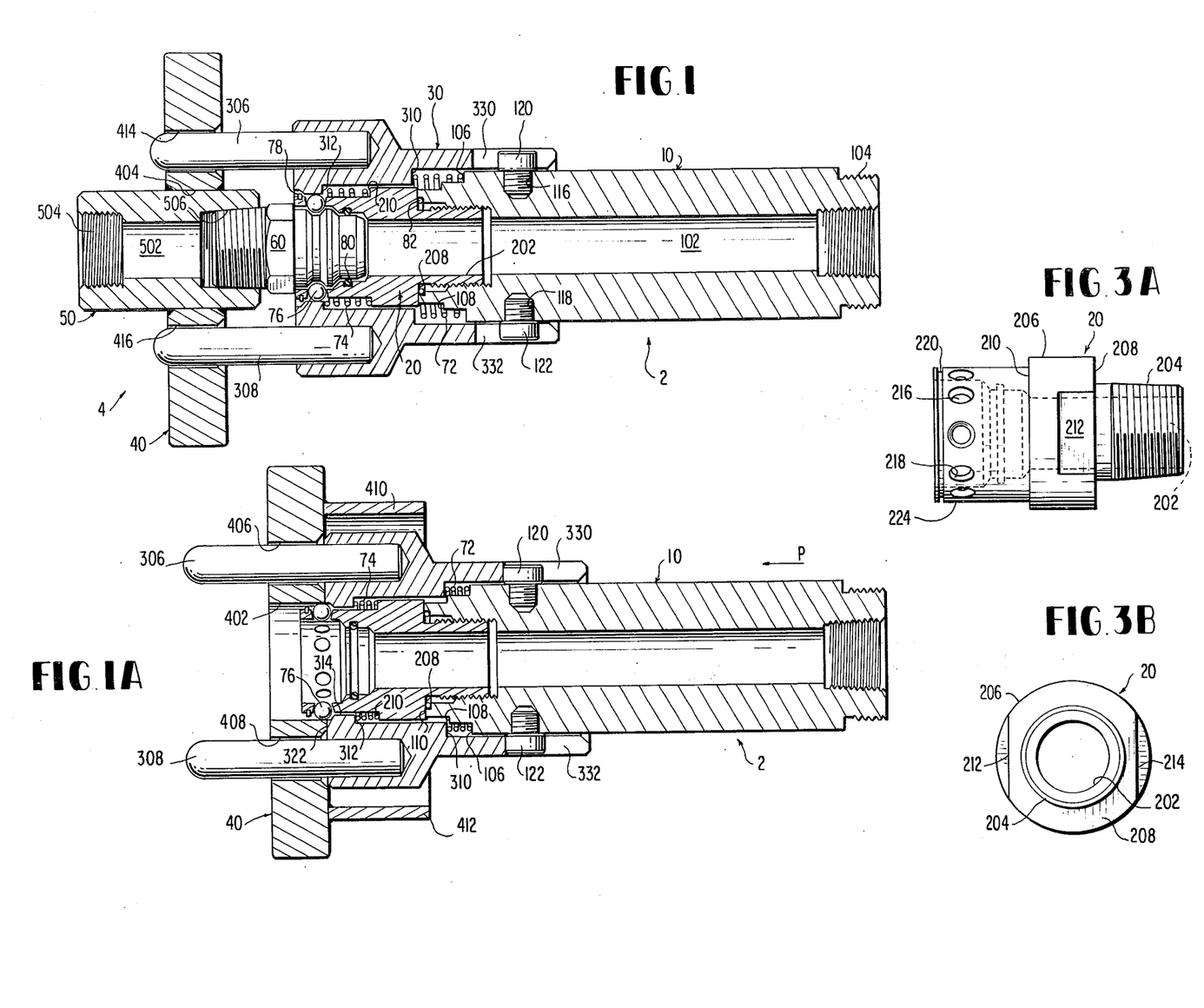
FIG. 1 is a longitudinal sectional view of a first embodiment in the spring locked position.
FIG. 1A is a longitudinal sectional view of the first embodiment in the preset position.
FIG. 3A is a side view of the female coupling member.
FIG. 3B is a front view of the female coupling member.

FIG. 1 is a cross sectional view of the first embodiment of the quick connect/disconnect coupling. The coupling assembly comprises a first part, generally designated 2, connected to one end of a hose, which mates with a receiver assembly, generally designated 4, mounted on a larger underwater structure.

Coupling assembly 2 includes an adapter member 10, one end of which is fitted for connection to a hose. A female coupling member 20 is fitted to the other end of adapter 10. An outer sleeve 30 overlies coupling member 20 and a portion of adapter 10. The sleeve contains indexing pins which mate with corresponding thru-holes in a register plate 40, comprising part of receiver assembly 4. Plate 40 mounts a register adapter 50, one end of which is fitted for connection to a hose and the other end of which mounts a male coupling member 60.

The elongated, preferably cylindrical adapter 10 (see FIG. 2) has an axial bore 102 extending therethrough. Adapter 10 has a threaded end portion 104 which receives a corresponding threaded end of a hose (not shown). End portion 104 may be threaded internally and externally to receive hoses of different sizes or to receive a covering sleeve (not shown) with the external threads. The axially opposite end of adapter 10 is stepped to define circumferential shoulders 106 and 108, axially spaced from each other and from end face 110.

Figure 2:
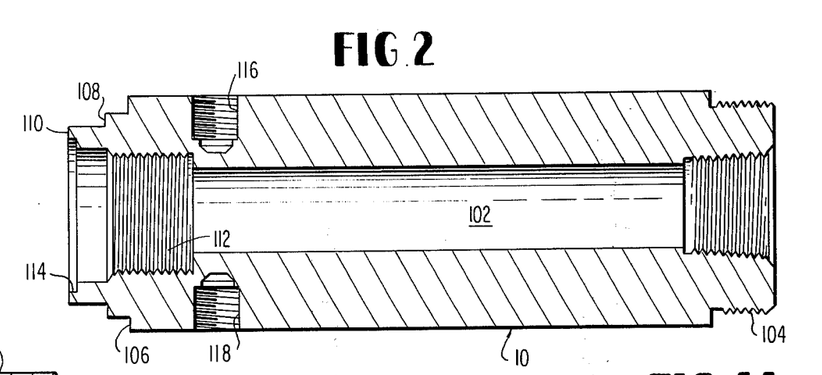
FIG. 2 is a detail of the adapter member.

Adapter 10 has an internally threaded surface portion 112, of enlarged diameter relative to bore 102, for receiving the threaded end of female coupling member 20. A circumferential groove 114 is formed in end face 110. An O-ring 82 is fitted in groove 114 to provide a seal between adapter 10 and the coupling member. A pair of threaded screw holes 116, 118 extend radially in from the outer surface of adapter 10 along a common axis, and preferably 180° apart. A pair of shoulder screws 120, 122 seat in threaded holes 116, 118, respectively.

The female coupling member (see FIGS. 3A, 3B), generally designated 20, has an axial bore 202 extending therethrough corresponding to bore 102 in adapter 10. One end portion 204 of coupling member 20 is externally threaded to mate with the internally threaded end portion 112 of adapter 10. The central portion 206 of member 20 is diametrically enlarged, forming a pair of axially opposite, circumferential shoulders 208 and 210. Preferably, radially opposite portions 212 and 214 of center portion 206 are machined to form flat surfaces which may be engaged by a wrench, or other tightening tool, in a known manner for securing coupling member 20 to adapter 10.

Coupling member 20 is provided with a plurality of openings 216 around its circumference at its axially opposite end from threaded end 204. Openings 216 have chamfered sides 218 so that the radially outer ends are diametrically larger than the radially inner ends. A circumferential groove 220 is provided between openings 216 and the adjacent end of the coupling member 20 to receive a retainer ring 78.

Internally, coupling member 20 may be provided with an O-ring 80 to provide a seal between coupling members 20 and 60.

Figure 4:
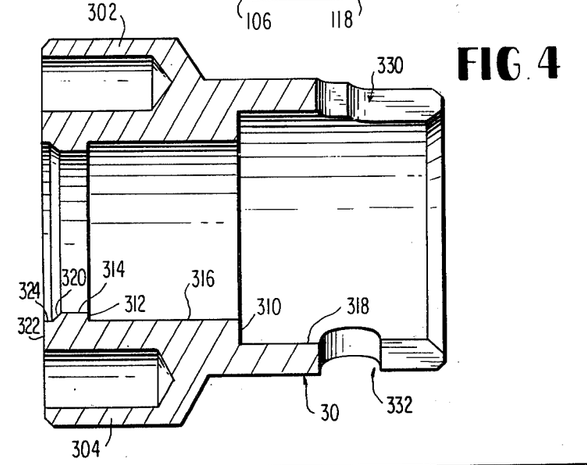
FIG. 4 is a detail of the outer sleeve of the first embodiment.

Coupling assembly 2 also comprises an outer sleeve, generally designated 30 (see FIG. 4). Sleeve 30 has a pair of diametrically enlarged regions 302 and 304 at one end spaced approximately 180° apart. Indexing pins 306 and 308 are fixedly received in bored openings in regions 302 and 304, respectively. Sleeve 30 has a stepped internal axial bore which forms a pair of internal shoulders 310 and 312 separating three internal axial surfaces 314, 316 and 318. When coupling 2 is fully assembled (FIG. 1), the largest diameter surface 318 rides on the outer surface of adapter 10, the intermediate surface 316 rides on the surface of the diametrically enlarged central portion 206 of coupling 20, and surface 314 having the smallest diameter co-operates with openings 216 in coupling member 20. At one end surface 314 terminates at shoulder 312; at its other end it terminates at a beveled shoulder 320.

Sleeve 30 is provided with diametrically opposed, successive or double-J slots 330 and 332 (see FIG. 4A) which cooperate with shoulder screws 120 and 122, respectively, on adapter 10. Since both slots are identical, reference below will be made only to slot 330 and its cooperating shoulder screw 120.

Figure 4A:
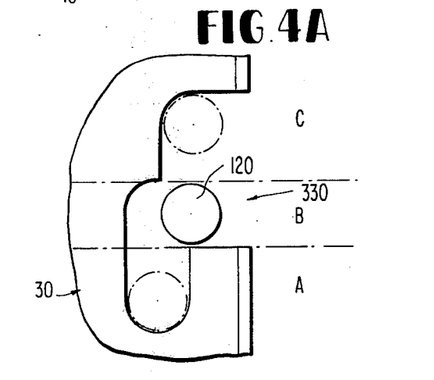
FIG. 4A is a detail of the locking slot formed in the outer sleeve of the first embodiment.

As will be described in more detail below, when coupling assembly 2 is fully assembled, sleeve 30 and adapter 10 are relatively movable axially and rotatably between three positions; a first, or preset position in which shoulder screw 120 is located in slot region A; a second, spring lock position in which shoulder screw 120 is located in slot region B; and a third, or positive lock position in which shoulder screw 120 is located in slot region C.

Figure 5:
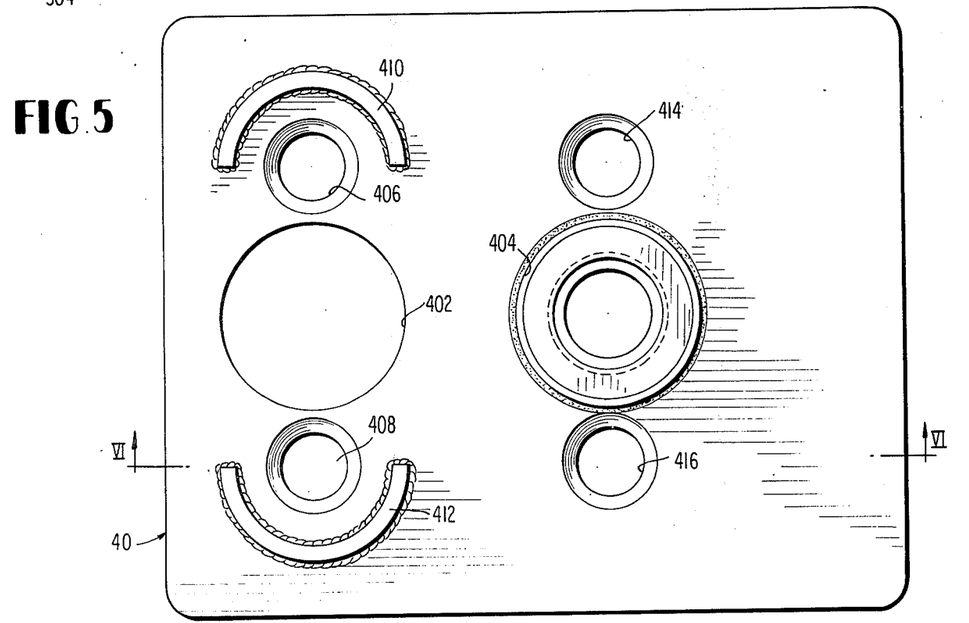
FIG. 5 is a plan view of the register plate of the first embodiment.

Coupling assembly 2 connects with receiver assembly 4 located on the underwater structure. Receiver assembly 4 includes a register plate 40. Plate 40 has two relatively large diameter thru-holes 402 and 404, which may or may not be of the same diameter. Adjacent thru-hole 402 are two diametrically opposed holes 406, 408 of relatively smaller diameter than hole 402 but large enough to accommodate therethrough index pins 306, 308, respectively. An arcuately shaped member 410 upstands from the face of register plate 40 around thru-hole 406. A similar upstanding plate 412 partially surrounds thru-hole 408.

A pair of axially opposite thru-holes 414 and 416 lie adjacent thru-hole 404. The centers of holes 414 and 416 lie on axially opposite extensions of a diameter of thru-hole 404 in the same way that the centers of thru-holes 406 and 408 lie on axially opposite extensions of thru-hole 402. Thru-holes 414 and 416 are diametrically smaller than thru-holes 404; these holes are large enough and are spaced a sufficient distance apart to accommodate therethrough index pins 306 and 308, respectively.

Figures 6, 7:
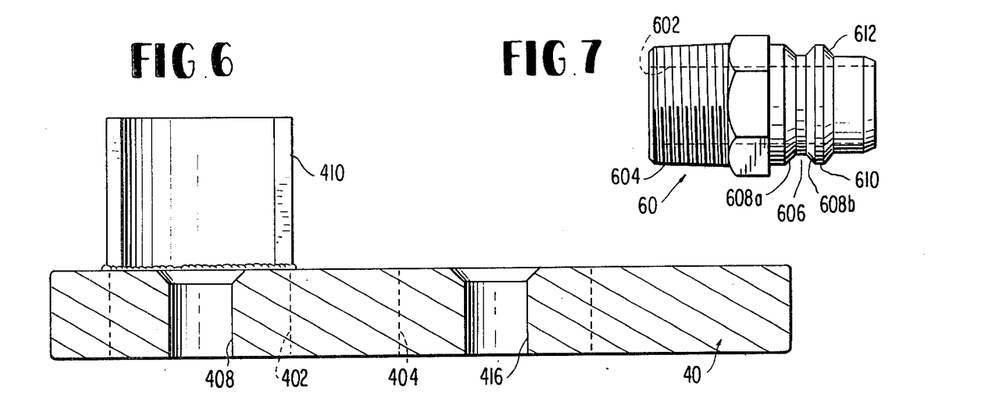
FIG. 6 is a section taken along VI—VI of FIG. 5.
FIG. 7 is a detail of the male coupling member.

A register plate adapter 50 is mounted in thru-hole 402 so that opposite ends of the adapter 50 protrude from opposite faces of the register plate 40. Adapter 50 has an internal axial bore 502 corresponding to axial bores 202 and 102 of coupling member 20 and adapter 10, respectively. A pair of internally threaded enlarged diameter portions 504 and 506 are located at opposite ends of bore 502.

FIG. 7 shows the male coupling member 60 having an internal bore 602 corresponding to internal bores 502, 202 and 102, respectively, and an externally threaded end portion 604 which mates with internally threaded end portion 506 of adapter 50. Coupling member 60 also has a grooved region 606 having beveled side surfaces 608a and 608b.

A first spring 72, coaxial with adapter 10 and sleeve 30, is positioned over the end of adapter 10 to push against adapter shoulder 106 and sleeve shoulder 310. A second spring 74 is located in a space between opposed complementary shoulders 210 and 312 of the female coupling 20 and sleeve 30, respectively. A plurality of retainer balls 76 seat in the holes 216 of coupling member 20. Radial movement of balls 76 is limited on the one hand by the inner diameter of openings 216, which are smaller than the diameter of balls 76 and on other hand by the internal surfaces of sleeve 20.

Before a coupling between members 20 and 60 can be effected, coupling assembly 2 must be preset. This is accomplished in the following way:

Coupling assembly 2 is located on register plate 40 so that indexing pins 306 and 308 engage thru-holes 406 and 408, respectively, of register plate 40. This permits axial movement of sleeve 30 while preventing rotational movement thereof. In the undersea environment for which this coupling is primarily intended, the visibility at the ocean bottom is very poor. Members 410 and 412 therefore act as guides for sleeve 30 to facilitate engagement of pins 306, 308 with holes 406, 408.

Sleeve 30 and adapter 10 are arranged so that shoulder pin 120 is located in region B (see FIG. 4A); an axial pushing force in the direction of arrow P is then exerted on adapter 10 by, for example, the manipulator arm of a deep sea diving bell. The entire coupling assembly 2 moves in the direction P until sleeve face 322 abuts the face of register plate 40 to prevent further forward movement of sleeve 30. Adapter 10 (to which is fixed coupling member 20) continues to move in the direction P, compressing springs 72 and 74, until stopped by the abutting engagement of adapter shoulder 108 and sleeve shoulder 310 (see FIG. 1A). At this time, a counterclockwise rotational movement is imparted to adapter 10 to move shoulder screw 120 into region A of slot 330. Coupling assembly 2 may now be withdrawn from register plate 40 and sleeve 30 will be retained in its preset position, as shown, in which retainer balls 76 are relatively freely movable within their openings 216. The space between sleeve surface 324 and exterior surface 224 of coupling member 20 is less than the diameter of balls 76. Interior sleeve surface 324 partially overlies openings 216 a sufficient amount to prevent the balls from falling out of their holes when coupling assembly 2 is preset.

Once assembly 2 is in the preset condition, a connection can be made between coupling members 20 and 60. Assembly 2 is located so that index pins 306 and 308 engage thru-holes 414 and 416, respectively. Adapter 10 is again urged in the direction of arrow P; balls 76 have sufficient freedom of movement to permit them to ride up beveled surfaces 612, over surface 610 and into groove 606 of coupling member 60. A clockwise rotational movement now imparted to adapter 10 causes shoulder screw 120 to move into slot region B.

This action releases sleeve 30 from its preset locked condition and allows it to be urged by springs 72 and 74 in the direction of arrow P into its axially extended position. Forward movement of sleeve 30 is stopped by retainer ring 78 located in groove 220 of coupling member 20. In this position, as shown in FIG. 1, sleeve surface 314 covers openings 216 to inhibit radial outer movement of balls 76; this locks balls 76 into groove 606 and inhibits lateral movement of coupling members 20 and 60 relative to each other. Sleeve 30 is held in this locking position by the action of springs 72 and 74.

A further clockwise rotation of adapter 10 moves shoulder screw 120 into slot region C. Shoulder screw 120 engages J-slot wall 331; this provides a positive lock by inhibiting movement of sleeve 30 in the direction opposite arrow P relative to adapter 10.

In order to unlock the coupling assembly, simple, but positive movements must be applied to adapter 10 and sleeve 30, namely, a clockwise rotational motion (to adapter 10) to shift the shoulder screws from slot region C to slot region B, and a pulling force (to sleeve 30) in the direction oppsite arrow P sufficient to overcome the force imparted by springs 72 and 74 to move sleeve 30 toward its axially retracted (preset) position. This latter movement frees retainer balls 76, allowing them to move radially outward over beveled sides 608b and surface 610, as coupling member 20 is pulled free of coupling member 60.

A second embodiment of the quick connect/disconnect coupling of this invention is shown in FIGS. 8–10D. In the first embodiment described above and the second embodiment to be described below, the same reference numerals are used to denote like parts.

Adapter 10, female coupling 20, register adapter 50 and male coupling member 60 all have the same construction in both embodiments. In the second embodiment, sleeve 30' differs from sleeve 30 only in the design of diametrically opposed J-slots 350, one of which is shown in detail in FIG. 9. As will be made clear below, this embodiment does not require preseting of the sleeve. Thus, it is unnecessary to provide slot 350 with a preset region, corresponding to preset region A of slot 330. Spring lock region B and positive lock region C of slot 350 correspond to similarly referenced regions B and C of slot 330 of the first embodiment.

Register plate assembly 45 may, for manufacturing convenience, be composed of three plates 452, 454, and 456. The three plates may be secured to each other by four bolts 458 through registered bolt holes 460 in each plate. All three plates have a relatively large diameter central thru-hole 462a, 462b, and 462c. When plates 452, 454, and 456 are mounted together as shown in FIG. 8, thru-holes 462 define a bore in which adapter 50 is fixedly secured, by press-fitting, welding, etc.

Figure 10A:
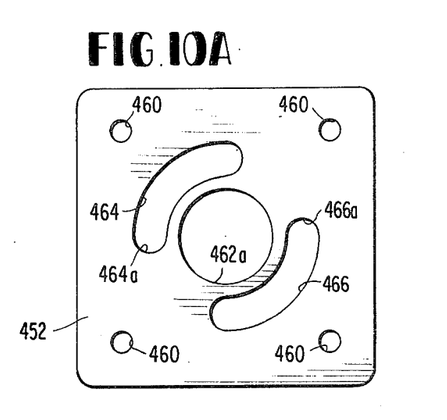
FIGS. 10A–10D show the register plate assembly of the second embodiment.

Referring to FIG. 10A, plate 452 comprises a pair of diametrically opposed arcuate thru-slots 464, 466. The slots are dimensioned to accommodate therethrough indexing pins 306 and 308, respectively.

Figure 10B:
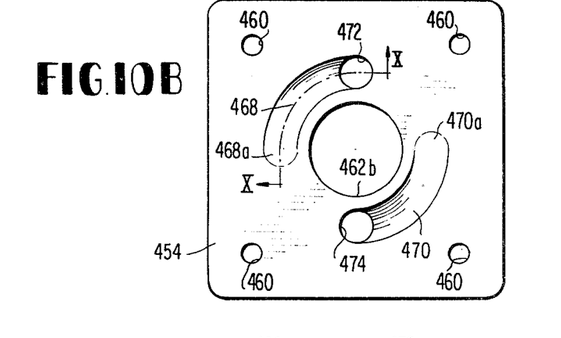
Figure 10C:
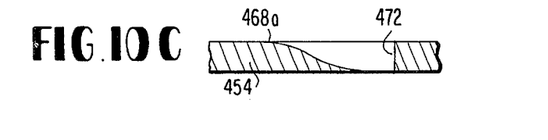

Referring to FIGS. 10B–10C, plate 454 comprises a pair of diametrically opposed arcuate slots 468, 470. In an arcuate distance of, for example, 90°, slots 468, 470 increase in depth, culminating in thru-holes 472, 474 (see FIG. 10C). Cammed slots 468 and 470 register with through slots 464 and 466, respectively, when plates 452 and 454 are mounted together. Further, slots 468 and 470 are dimensioned the same as slots 464 and 466 to accommodate indexing pins 306 and 308, respectively.

Figure 8:
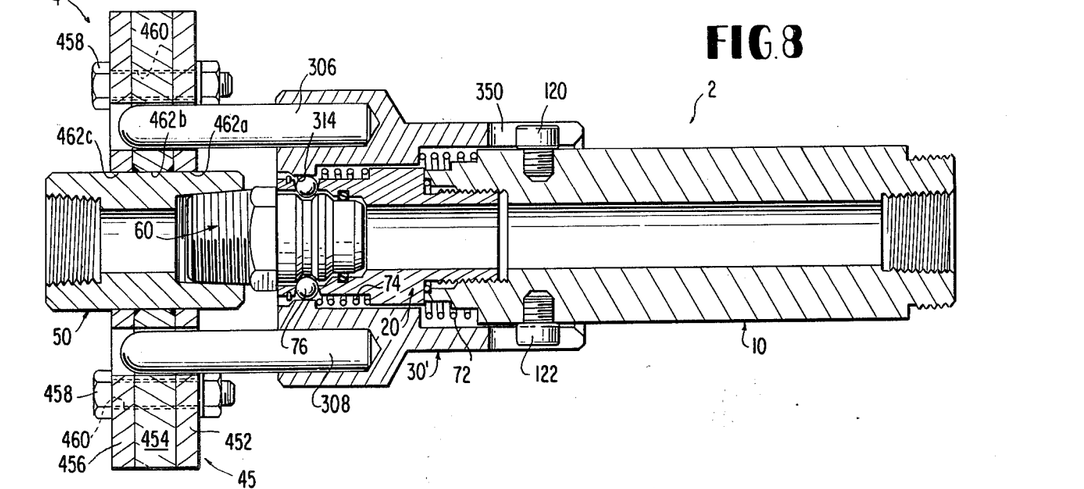
FIG. 8 is a longitudinal sectional view of a second embodiment.
Figure 10D:
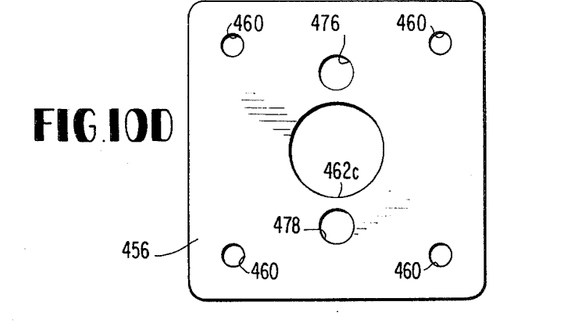
Figure 11:
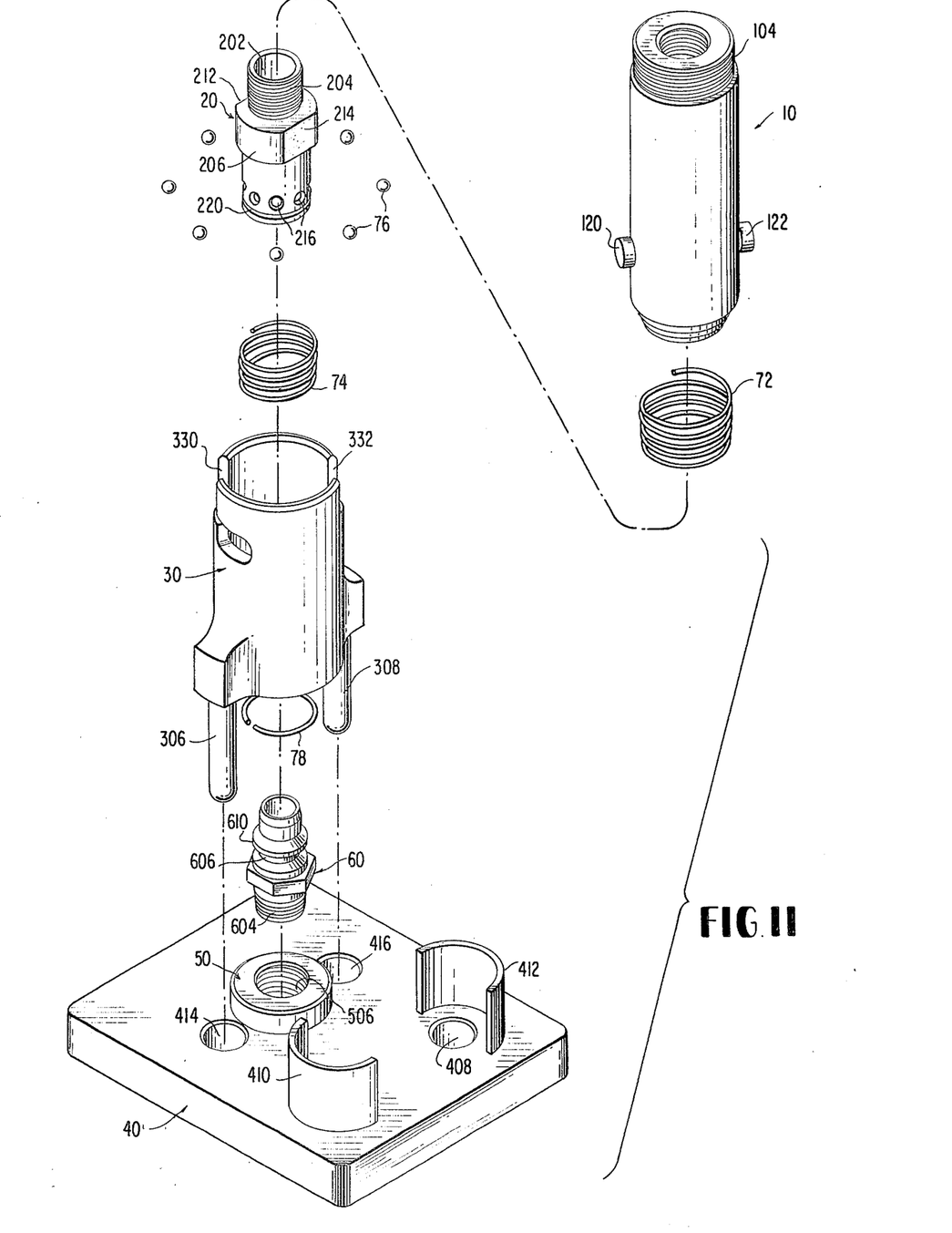
FIG. 11 is an exploded view of the first embodiment.

Referring to FIG. 10D, register plate 456 comprises a pair of diametrically opposed thru-holes 476, 478 which are dimensioned and spaced to accommodate indexing pins 306 and 308, respectively, and which register with thru-holes 472 and 474, respectively, of plate 454 when mounted as shown in FIG. 8.

Figure 8A:
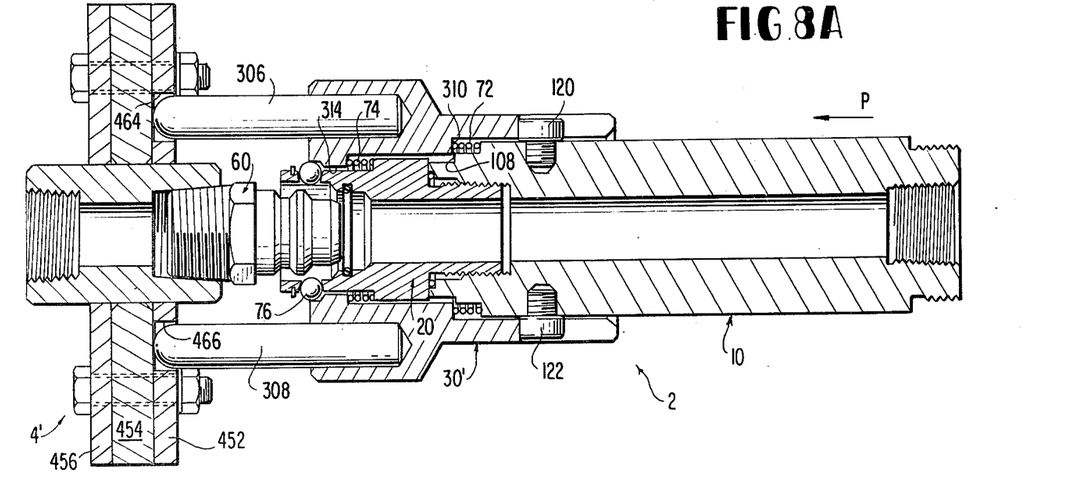
FIG. 8A is a longitudinal sectional view of the second embodiment taken at right angles to FIG. 8 and showing the coupling assembly in its preset condition prior to locking engagement.
Figure 9:
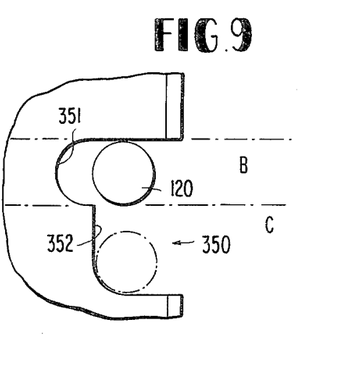
FIG. 9 shows a detail of the slot formed in the outer sleeve of the second embodiment.

FIG. 8A is a sectional view at right angles to the sectional view of FIG. 8 and shows the assembly prior to coupling. Coupling assembly 2 is first located with respect to register assembly 4' such that indexing pins 306 and 308 locate in slots 464 and 466 of plate 452 adajcent ends 464a and 466a. Pins 306 and 308 bottom-out against the upper cam surfaces 468a and 470a of plate 454. If shoulder screw 120 is not already positioned in slot region B, an initial counterclockwise motion is imparted to adapter 10; slot ends 464a and 466a act as stops against pins 306 and 308 to prevent sleeve 30' from rotating with adapter 10. Adapter 10 is thus rotated relative to sleeve 30' so that shoulder screw 120 locates in slot region B (FIG. 9).

As a pushing force in the direction of arrow P is exerted on adapter 10, the forward motion in the same direction of sleeve 30' is inhibited by cam surfaces 468a and 470a. Forward movement of adapter 10 continues until adapter shoulder 108 abuts sleeve shoulder 310 and shoulder screw 120 abuts arcuate J-slot face 351.

This condition corresponds to the preset position of the first embodiment. Retainer balls 76 are free to move radially to permit full engagement of couplings 20 and 60. A rotational movement is imparted to adapter 10 to move coupling assembly 2 through a 90° arc along guide slots 468 and 470, at the same time maintaining an application of force in the direction of arrow P. This causes the entire coupling assembly 2 to move axially as indexing pins 306 and 308 follow the sloped faces of cammed slots 468 and 470.

Just prior to indexing pins 306 and 308 registering with thru-holes 472 and 474 at the ends of slots 468 and 470, respectively, coupling members 20 and 60 will be fully engaged (in the positions shown in FIG. 8). When pins 306 and 308 register with thru-holes 472 and 474, springs 72 and 74 urge sleeve 30' into the direction of arrow P so that sleeve surface 314 locks retainer balls 76 into grooves 606 of male coupling member 60. This is the spring lock position shown in FIGS. 8 and 9. A positive lock can be obtained by imparting a rotational movement to adapter 10 in the opposite or counter-clockwise direction. This shifts shoulder screw 120 into slot region C. Slot edge 352 and shoulder screw 120 cooperate to prevent relative movement between adapter 10 and sleeve 30' to unlock retainer balls 76.

Uncoupling in the second embodiment is accomplished in the same way as in the first embodiment. If the coupling assembly is in the positive lock position (shoulder screw 120 in J-slot region C), a clockwise rotational force is applied to adapter 10 to shift shoulder screw 120 into J-slot region B. A positive pulling force is then applied to sleeve 30' in the direction opposite arrow P sufficient to overcome the biasing action of springs 72 and 74. This causes sleeve 30' to move toward its axially retracted position and free retainer balls 76 from their locked condition in groove 606.

Figure 12:
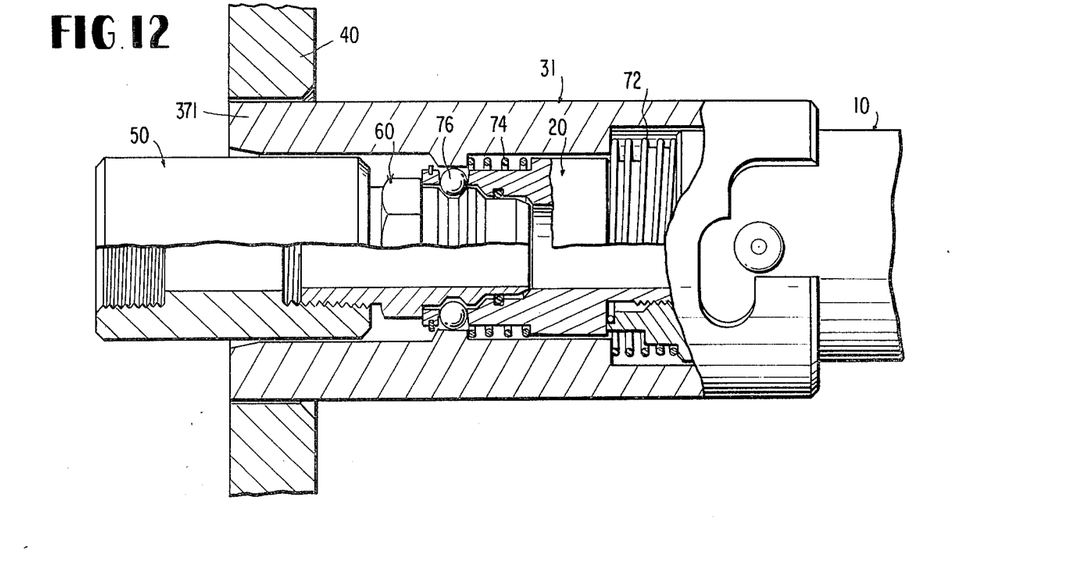
FIG. 12 shows a modification of the outer sleeve.

FIG. 12 shows a modified version of the sleeve. In sleeve 37, separate indexing pins are omitted and the sleeve is extended at 371, 373 to perform the same function as the indexing pins. This modification is applicable to both embodiments described above.

While a specific embodiment of the invention has been shown and described in detail, it will be understood that the invention may be modified without departing from the spirit of the inventive principles as set forth in the hereafter appended claims.

What is claimed is:

1. A quick connect/disconnect coupling assembly primarily for use in underwater environments of great depths, comprising:
   a first coupling member having releasable locking means;
   a sleeve mounted over said first coupling member and movable relative thereto between locking and unlocking positions, wherein, in said locking position, said sleeve locks said releasable locking means, and, in said unlocking position, said sleeve unlocks said releasable locking means;
   means normally biasing said sleeve for movement into said locking position;
   a second coupling member engagable with said first coupling member, said second coupling member including means for urging said sleeve and said first coupling member into relative movement opposite the normal biasing force of said bias means and into said unlocking position, and means for restoring said sleeve to said locking position upon engagement of said first and second coupling members with each other; and
   guide means cooperating with said urging means and said restoring means for guiding said first coupling member and said sleeve:
      (a) along a first path of relative movement into a pre-set position, said guide means acting to lock said sleeve against movement into said locking position,
      (b) along a second path of relative movement into a spring lock position, in which said sleeve is movable into its locking position by the action of said bias means and into its unlocking position by a force applied to said sleeve opposite the force exerted by said bias means, and
      (c) along a third path of relative movement into a positive lock position in which said guide means prevents movement of said sleeve out of its locking position into its unlocking position.

2. The coupling assembly according to claim 1, wherein said first and third paths of relative movement are rotational and in opposite directions; and said second path of relative movement is axial.

3. The coupling assembly according to claim 2, wherein said sleeve overlies at least a portion of said first coupling member and said guide means comprises at least one slot formed in one of said sleeve and said first coupling member and at least one pin mounted on the other of said sleeve and said first coupling member and engaging said slot.

4. The coupling assembly according to claim 3, wherein said at least one slot is a double-J slot.

5. A quick connect/disconnect coupling assembly primarily for use in underwater environments of great depths, comprising:
   a first coupling member having releasable locking means;
   a sleeve mounted over said first coupling member and movable relative thereto between locking and unlocking positions, wherein, in said locking position, said sleeve locks said releasable locking means, and, in said unlocking position, said sleeve unlocks said releasable locking means;
   means normally biasing said sleeve for movement into said locking position;
   a second coupling member engagable with said first coupling member, said second coupling member including means for urging said sleeve and said first coupling member into relative movement opposite the normal biasing force of said bias means and into said unlocking position, and means for restoring said sleeve to said locking position upon engagement of said first and second coupling members with each other; and
   guide means cooperating with said urging means and said restoring means for guiding said first coupling member and said sleeve:
      (a) along a first path of relative rotational movement into an axially retracted pre-set position, said guide means acting to lock said sleeve against relative axial movement in said pre-set position,
      (b) along a second path of relative axial movement into a spring lock position, in which said sleeve is movable into its axially extended position by the action of said bias means and into its axially retracted position by a force applied to said sleeve opposite the force exerted by said bias means, and
      (c) along a third path of relative rotational movement into a positive lock position in which said guide means prevents axial movement of said sleeve from its axially extended into its axially retracted position.

6. The coupling assembly according to claim 5, wherein said sleeve overlies at least a portion of said first coupling member and said guide means comprises at least one slot formed in said sleeve and at least one pin mounted on said first coupling member and engaging said slot.

7. The coupling according to claim 6, wherein said at least one slot is a double-J slot.

8. A quick connect/disconnect coupling assembly comprising:
- a first coupling member having releasable locking means;
- a sleeve, having indexing means extending axially therefrom, mounted for rotational and axial movement relative to said first coupling member, said sleeve having further locking means engaging said releasable locking means when said sleeve is in an axially extended position, said further locking means being disengaged from said releasable locking means when said sleeve is in an axially retracted position;
- bias means coupled between said first coupling member and said sleeve and normally biasing said sleeve into its axially extended position;
- means for locking said first coupling member and sleeve against relative axial movement opposite the force of said bias means and into said unlocking position;
- a second coupling member; and
- means mounting said second coupling member to a relatively rigid structure, said mounting means comprising a register plate having openings therein for receiving said indexing means, wherein said openings in said register plate comprise arcuate slots which terminate at one end in through holes, said arcuate slots co-operating with said indexing means to exert a reactive force against said sleeve when said first coupling member if urged toward said second coupling member to permit movement of said sleeve into its axially retracted position, said slots guiding said first coupling member relative to said second coupling member to bring said first and second coupling members into coupling engagement, said indexing means engaging said through holes at the end of the path guided by said slots wherein said sleeve is urged into its axially extended position by said bias means to lock said first and second coupling members in engagement;

said first and second coupling members being freely engagable with and disengagable from each other when said sleeve is in its axially retracted position; and said sleeve being movable under the action of said bias means between its axially retracted position and its axially extended position upon a relative rotational movement of said sleeve and first coupling member.

9. The coupling assembly according to claim 8, wherein said sleeve overlies at least a portion of said first coupling member and said means for locking said first coupling member and sleeve against relative axial movement comprises at least one slot formed in one of said sleeve and first coupling member and at least one pin mounted on the other of said sleeve and said first coupling member and engaging said slot.

10. The coupling according to claim 9, wherein said at least one slot is a double-J slot.

11. The coupling assembly according to claim 8, said means for locking said first coupling member and sleeve against relative axial movement comprising a guide slot in one of said sleeve and first coupling member and a cooperating pin in the other of said sleeve and first coupling member for guiding said sleeve and first coupling member into a positive lock position along a path of relative rotational movement opposite the path of arcuate movement bringing said coupling members into coupling engagement.

12. The coupling assembly according to claim 8, wherein said arcuate slots have cammed bottom surfaces.

13. The coupling assembly according to claim 12, said arcuate slots being arranged such that said indexing means co-operate with said cammed surfaces to exert a reactive force against said sleeve when said first coupling member is urged toward said second coupling member to permit movement of said sleeve into its axially retracted position, said slots guiding said first coupling member through a path of arcuate and axial movement to bring said first and second coupling members into coupling engagement, said indexing means engaging said thru-holes at the end of the path guided by said slots wherein said sleeve is urged into its axially extended position by said bias means to lock first and second coupling members in engagement.

* * * * *